July 10, 1928.
C. R. BIRDSEY
1,676,318
APPARATUS FOR MAKING LAP EDGED PLASTER SHEATHING BOARD
Filed March 20, 1922   6 Sheets-Sheet 2
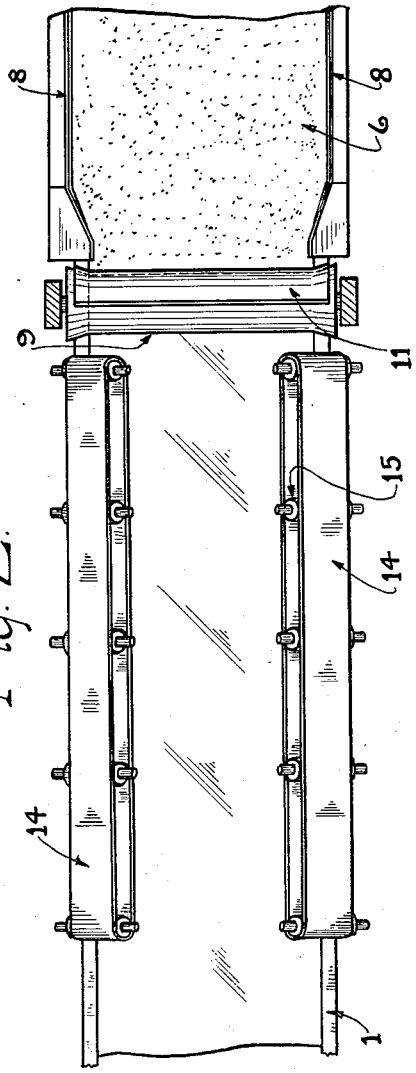
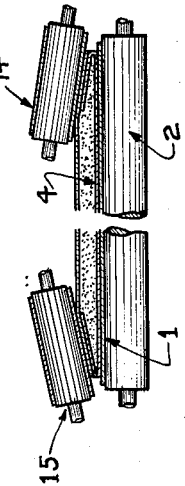
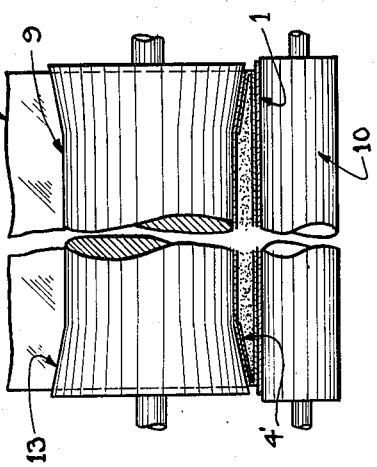
INVENTOR.
C. R. Birdsey
BY
ATTORNEY.

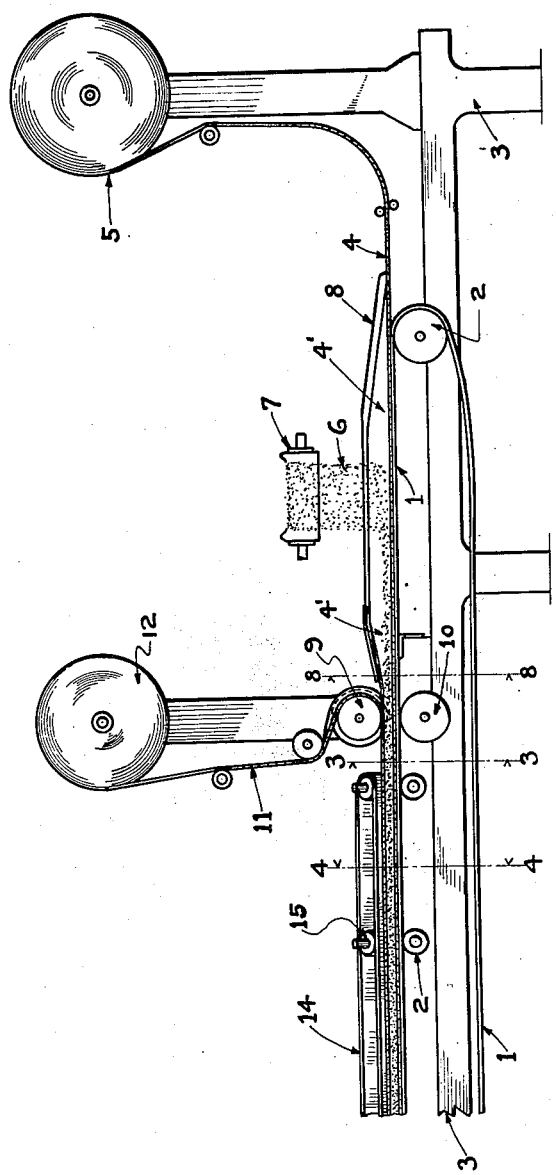

July 10, 1928.
C. R. BIRDSEY
1,676,318
APPARATUS FOR MAKING LAP EDGED PLASTER SHEATHING BOARD
Filed March 20, 1922   6 Sheets-Sheet 3
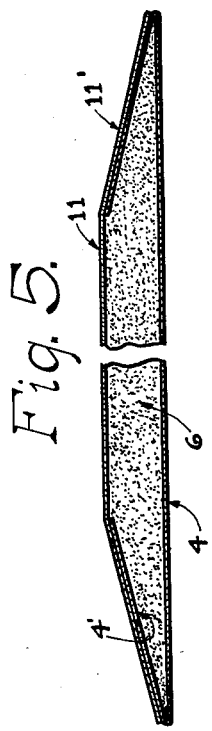
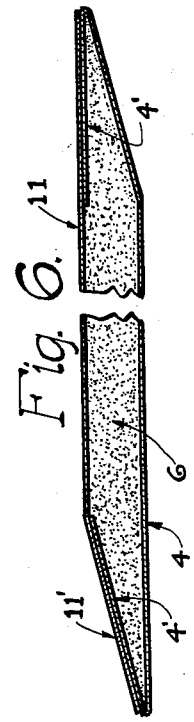
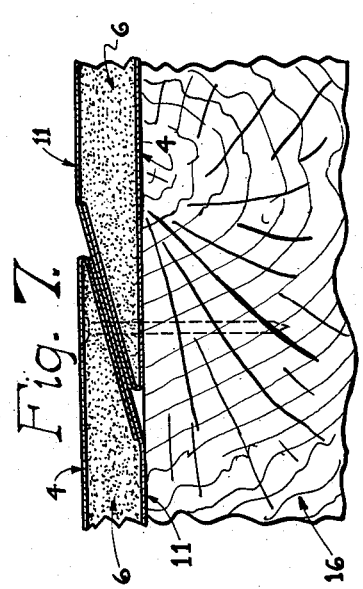
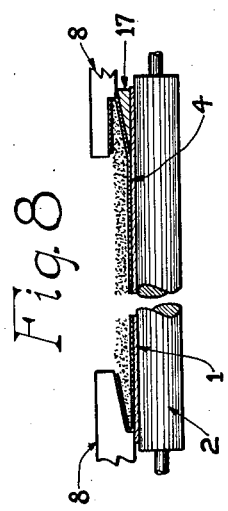
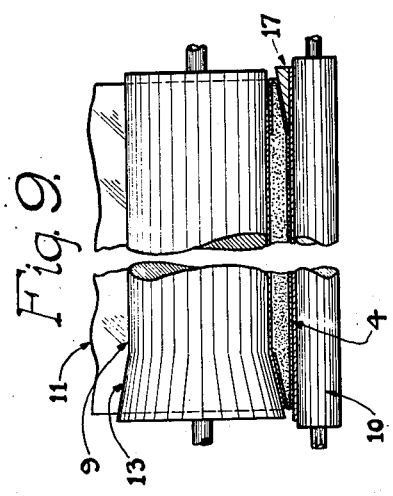
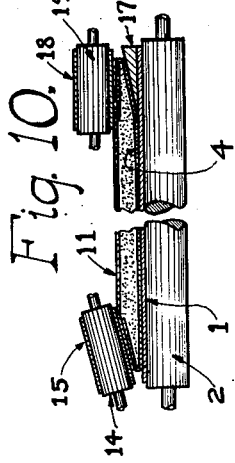
INVENTOR.
C. R. Birdsey
BY
ATTORNEY.

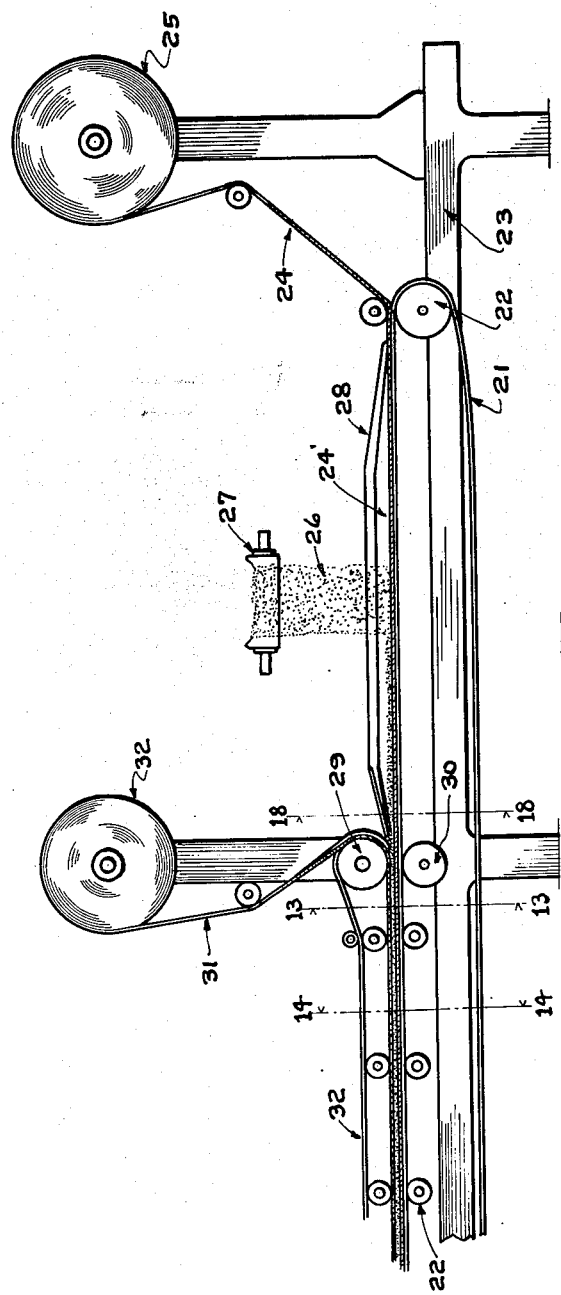

July 10, 1928. 1,676,318
C. R. BIRDSEY
APPARATUS FOR MAKING LAP EDGED PLASTER SHEATHING BOARD
Filed March 20, 1922 6 Sheets-Sheet 5
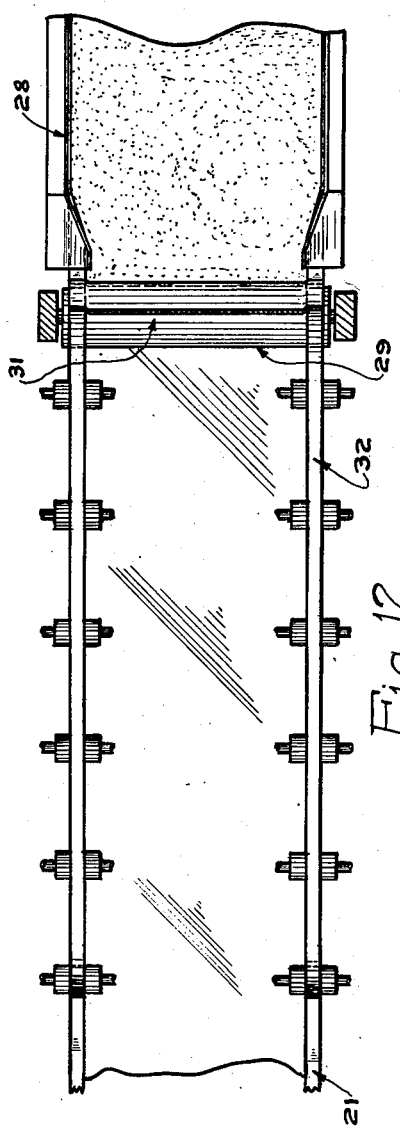
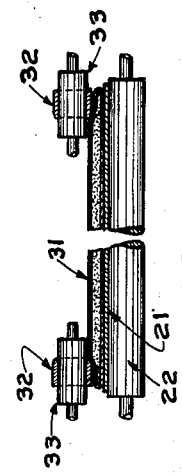
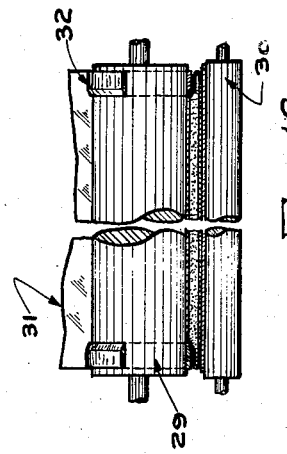
INVENTOR.
C.R. Birdsey
BY
ATTORNEY.

July 10, 1928.
C. R. BIRDSEY
1,676,318
APPARATUS FOR MAKING LAP EDGED PLASTER SHEATHING BOARD
Filed March 20, 1922  6 Sheets-Sheet 6
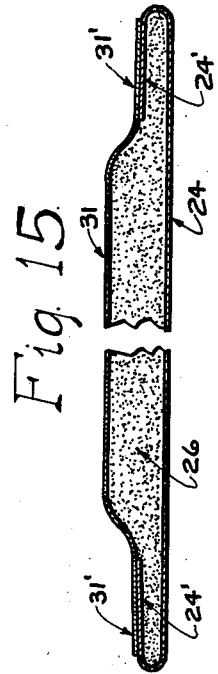
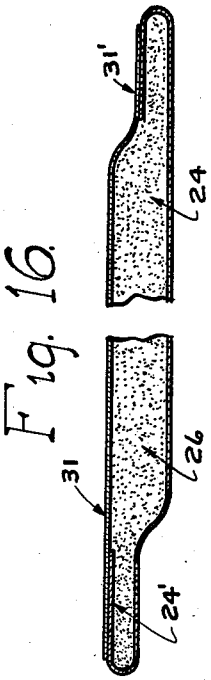
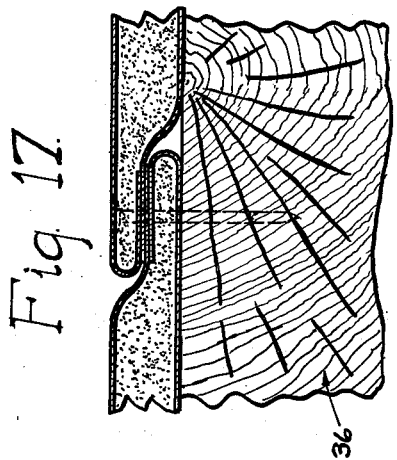
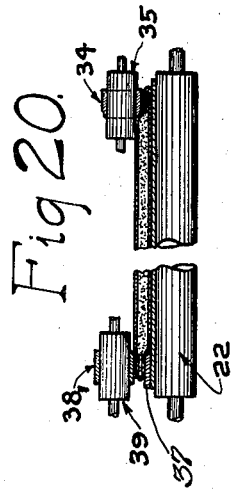
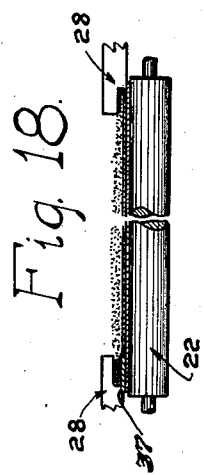
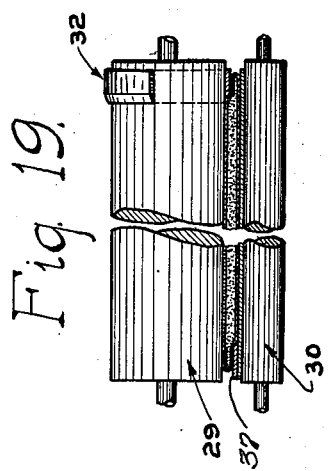
INVENTOR.
C.R. Birdsey
BY
ATTORNEY.

Patented July 10, 1928.

1,676,318

UNITED STATES PATENT OFFICE.

CHARLES R. BIRDSEY, OF HINSDALE, ILLINOIS, ASSIGNOR TO UNITED STATES GYPSUM COMPANY, OF CHICAGO, ILLINOIS, A CORPORATION OF ILLINOIS.

APPARATUS FOR MAKING LAP-EDGED PLASTER SHEATHING BOARD.

Application filed March 20, 1922. Serial No. 545,231.

This invention relates to improvements in composite boards and more particularly to lap edged plaster sheathing board and the method and apparatus for making the same.

It is an object of this invention to provide a method and apparatus for making paper covered plaster sheathing board the longitudinal edges of which are so formed as to lap over each other when placed together as described more particularly in my divisonal application Serial No. 605,896, filed December 9, 1922. It has been found the plaster board can be used to great advantage in the construction of frame houses by applying it as a sheathing over the studding before the clap board, stucco or pebble dash outside finish is applied. Heretofore a wooden sheathing has generally been used preferably of the ship lap type having the horizontal edges gained out on opposite sides so that the bottom of each board will overlap the top of the one next below to form a water shed.

The advantages of a plaster board with overlapped horizontal edges for a sheathing of this character are obvious as such a sheathing will not only form a water shed but will be fire proof, damp proof and will not be affected by changes in atmosphere or temperature.

While the preferred forms of this invention are illustrated on the accompanying sheets of drawings, it is to be understood that minor detail changes may be made without departing from the scope thereof.

In the drawings:

Figure 1 is a view in side elevation of a machine constructed in accordance with this invention, with parts broken away, for making a form of lap edged plaster sheathing board.

Figure 2 is a top plan view of Figure 1.

Figure 3 is a view in vertical section taken on the line 3—3, Figure 1.

Figure 4 is a similar view taken on the line 4—4 Figure 1.

Figure 5 is a view in transverse section, through a form of lap edged plaster sheathing board with the central portion broken away, as formed by the machine illustrated by Figures 1 to 4 inclusive, in which the longitudinal edges are tapered from the same face of the board to the opposite face.

Figure 6 is a similar view of another form in which the longitudinal edges are tapered from faces opposite each other to the other face.

Figure 7 is a detail view in transverse vertical section through the meeting horizontal or longitudinal edges of two adjacent boards illustrating their joint and application to the studding of a house.

Figure 8 is a view in vertical section through a machine adapted to form the plaster board having the longitudinal edges tapered from faces opposite each other, just before the top cover sheet is applied, and would correspond to a section taken on the line 8—8, Figure 1.

Figure 9 is a view similar to Figure 3 of a machine adapted to form this modified edge.

Figure 10 is a view similar to Figure 4 of this modified machine.

Figure 11 is a view similar to Figure 1 of a machine modified to form depressed edge portions.

Figure 12 is a top plan view of Figure 11.

Figure 13 is a view in vertical section taken on the line 13—13, Figure 11.

Figure 14 is a similar view taken on the line 14—14, Figure 11.

Figure 15 is a view in transverse section through another form of lap edged plaster sheathing board, with the central portion broken away, as formed by the machine illustrated by Figures 11 to 14 inclusive, in which the longitudinal edges on the same face are depressed parallel to the other face.

Figure 16 is a similar view of another form in which the longitudinal edges are depressed on faces opposite each other and are parallel to the other face.

Figure 17 is a detail view in transverse vertical section through the meeting horizontal or longitudinal edges of two adjacent boards having the depressed edge portions, illustrating their joint and application to the studding of the house.

Figure 18 is a view in vertical section through a machine adapted to form the plaster sheathing board having the longitudinal edges depressed on faces opposite each other and parallel to the other face, just before the top cover sheet is applied and would correspond to a section taken on the line 18—18, Figure 11.

Figure 19 is a view similar to Figure 13 of a machine adapted to form this modified edge, Figure 20 is a view similar to Figure 14 of this modified machine.

Plaster board comprising a plaster body with a covering of paper over the flat surfaces on each face and enclosing the longitudinal edges has been made by continuous means and when cut in uniform lengths has been applied to the studding of buildings as a substitute for laths to be plastered over to form walls and the more recently developed plaster wallboard is applied and painted or papered without first plastering over. Plaster board has also been applied as a sheathing for buildings under the clap board or stucco or other outer covering. With a stucco outer finish the ordinary form of plaster board is satisfactory but when used as a sheathing under clap boards plaster board on account of the abutting edges does not make as good a sheathing as the wooden ship lap board. In order to make plaster board more desirable than ship lap, on account of its inherent properties, for sheathing under clap boards, this invention contemplates a plaster board or plaster wallboard having a plaster body covered on each side and about the longitudinal edges by paper and having the longitudinal edges so formed that a portion of each board will overlap the top of the board below it when used for sheathing and will form a water shed in the same manner as ship lap boards.

In carrying out this invention a machine is employed that is very similar in principle to that disclosed in the C. R. Birdsey Patent 1,383,255 of June 28, 1921, with certain changes and additions, as will be hereinafter described, to adapt it to the formation of this particular lap edged plaster sheathing board.

Figure 1 illustrates the board forming end of such a machine which comprises a suitable endless conveyor 1 traveling over pulleys 2 mounted on a frame or table 3. A sheet 4 of paper or other suitable covering material is fed onto the conveyor from a supply roll 5. As shown, the cover sheet 4 extends over and is supported by the conveyor 1 and means is provided for discharging stucco, plaster, or other plastic material 6 on the sheet, such means preferably comprises a conveyor 7 for receiving the stucco and delivering it in a plastic state. Since conveyors for this purpose with means for rendering the stucco plastic are old in this art and forms no part of this invention there is no necessity for further illustrations or descriptions.

At each side of the table 3, adjacent the conveyor 1, is a member 8 arranged to engage the edges 4' of the sheet and fold or turn the edges up, maintains them in the turned up position as the plastic stucco is deposited from the conveyor 7 and after the plastic stucco has spread over the surface of the sheet to the turned up edges, then turn or fold the edges down over the body of the stucco. This means of folding the edges of the sheet over the plastic body also being old in the art, further description or illustration is not necessary.

As the sheet with the stucco enclosed by the folded over edges leaves the folding member 8 it passes between rolls 9 and 10 arranged on opposite sides of this conveyor, one above the other. A sheet 11 of paper or other suitable covering material is fed onto the upper roll 9 from a supply roll 12 and is passed over and under this roll to form the upper cover sheet of the plaster board.

The lower roll 10 over which the conveyor travels is cylindrical in form similar to the conveyor supporting pulleys 2 and the lower cover sheet 4 resting on the conveyor will be flat between the folded over edges. In order to taper the board along the longitudinal edges from the turned up edge toward the center of the body of the stucco, the fold at the edges makes an abrupt turn to form the outer or longitudinal edge and is then folded at an angle to the bottom sheet on the conveyor, which form is imparted during the passage of the edges of the sheet through the members 8. The upper roll 9 applies the top cover sheet 11 to the upper surface of the stucco body as it passes under the roll and causes the stucco to be spread evenly between the cover sheets to form a board of uniform thickness except at the tapered longitudinal edges. The top cover sheet 11 is of such width that when it is applied it extends from a point adjacent one longitudinal edge to a point adjacent the opposite edge and its edges lay over and contact with the tapered angular folds of the bottom sheet. To bend the edges 11' of the top cover sheet and apply them to the tapered edges as enclosed by the bottom sheet, the ends of the upper roll 9 are uniformly tapered outwardly on a constant increasing diameter, so that the angle of the conical surface 13 to the main cylindrical portion of the roll will correspond to the angle of the tapered ends to the flat body between them. As the edge portions of the upper cover sheet 11 are bent downwardly towards these edges and laid over the folded in portions of the bottom sheet which enclose the plastic body therein at the time both sheets pass through or between the rolls 9 and 10 the pressure on the stucco banked up on the lower sheet before the upper roll 9 will insure the filling in of the tapered edges and main body between the two sheets and at the same time sufficient stucco will flow between the bent down edge portions of the upper sheet and folded in edge portions of the lower sheet to bond them together. In order to insure the bonding between these portions of the cover sheets and maintain the tapered contour of the edges while the plastic body is beginning to set, an ironing or pressing means is provided to continue over each tapered edge portion from the time the board leaves the forming rolls 9 and 10 until the edges of the cover sheets are bonded and the plastic body set sufficiently to maintain its shape without forming means. This means for continuing the shape of the edges preferably comprises an endless belt 14 on each side of the table mounted to travel over angularly disposed pressure rollers 15 mounted in any desired manner so that the contacting surfaces of the belts are parallel to the tapers formed at the edges and will maintain constantly the form imparted thereto by the forming rolls 9 and 10.

The table and conveyor are of such length that the continuously formed board after passing beyond the edge ironing devices will allow the plastic body to set sufficiently to be cut off in desired lengths and be transported, without deforming its shape, to kilns where the set is completed and excess moisture removed to complete the product.

Figure 5 illustrates a section taken at right angles to the bottom cover sheet and at right angles to the longitudinal edges from which it is seen that the longitudinal edges are tapered from the same face of the board to the other face and the entire tapered portion is enclosed by the fold 4' of the bottom cover sheet 4 and also covered by the edge portion 11' of the top cover sheet 11. It is contemplated to employ this plaster sheathing board by applying the longitudinal edges horizontally against the studding of the frame of the building and, by reversing the flat surface of every other board in a vertical direction, the adjacent tapered edges will overlap and the overlapped joints nailed to the studding 16, as shown in Figure 7. It is to be noted here that the nail securing the horizontal edges will pass through three thicknesses of paper in each board. In this form when applied as sheathing only one half, or every other horizontal jointure, will provide water shed joints. It is therefore, contemplated by this invention to form a plaster sheathing board in which the longitudinal edges are tapered from faces opposite each other to the other face, as shown in Figure 6, so that the boards so formed when applied as sheathing need not be reversed and the lower horizontal edge of each will lay over or lap the top horizontal edge of the board next below it and each horizontal joint will be a water shed, making a most desirable sheathing to be used with clap boards.

The machine to form this type of tapered edge, while remaining the same in principle as the one above described, is modified to a certain degree, and since the changes are but slight the entire machine is not illustrated and only the changes shown. As the edges are tapered from opposite faces uniformly they are parallel and as the same amount of paper is employed in the bottom cover sheet and each edge portion is turned up and then folded over the plastic body, it is only necessary to make certain changes on one side of the machine. It is contemplated to utilize the conveyor 1 to form the taper on one edge of the bottom cover sheet by applying a continuous wedge shaped addition 17 on the upper side of the conveyor adjacent one edge which addition or portion of the conveyor increases uniformly in thickness towards the edge and presents an inclined surface for the paper 4 of the bottom sheet to rest upon which is parallel to the conical enlargement 13 of the oppositely disposed end of the upper forming roll 9. The weight of the plastic stucco will cause the paper, dampened by the moisture in the stucco, to conform to the incline on the edge of the conveyor as it advances through the folding members 8 towards the forming rolls and on this side the folding member is arranged to engage the edge portion of the bottom cover sheet at the top of the inclined conveyor addition 17 turn it up straight while the plastic stucco is being deposited and then fold it down over the stucco parallel to the main flat face of the lower cover sheet resting on the conveyor just before it enters between the forming rolls. The end of the forming roll 9 adjacent the inclined conveyor addition 17 remains cylindrical and of the same diameter as the main body so that the upper cover sheet 11 applied thereby is parallel to the main body of the under cover sheet to the edge and lays over and is bonded to the folded in edge portion 4' of the under sheet in the same manner as on the opposite longitudinal edge, as hereinbefore described. Since it is necessary to insure the continuous contour of both edges after the formed board has passed from the forming rolls, the continuous inclined addition 17, to the conveyor will support the tapered portion of the under cover sheet resting thereon and it may not be necessary to provide any further means or ironing device on this side of the table, however, it is preferable to do so and this device differs from the one for the opposite edge only in that the contacting surface of the belt 18 passes over rollers 19 arranged to be supported parallel to the main flat body of the conveyor. The board then continues on to the end of the machine and is dried in the same manner as hereinbefore described.

While both of the above described tapered lap edged plaster sheathing boards make a very desirable sheathing and the lap joint a greatly improved jointure for both plaster board and wallboards on account of the securing nails passing through six thicknesses of cover sheet at the point where they are nailed to the studding, yet a still more desirable lap joint is formed if the edge portions are depressed parallel to the opposite face, instead of being tapered, for then an overlap with the adjacent surface of the edges in contact with each other will be insured and the securing nail will always pass through contacting inner surfaces of the boards, irrespective of irregularities in the horizontal edges or any other reason which might prevent a perfect and continuous contact between tapered edges.

With this end in view, the machine employed is very similar in principle to that described in the C. R. Birdsey Patent 1,383,255 of June 28, 1921, with certain changes and additions, as will be hereinafter described, to adapt it to the formation of this particular lap edged plaster sheathing board.

Figure 11 illustrates the board forming end of such a machine which comprises a suitable endless conveyor 21, traveling over pulleys 22 mounted on a frame or table 23. A sheet of paper or other suitable covering material 24 is fed onto the conveyor from a supply roll 25. As shown, the cover sheet extends over and is supported by the conveyor and means is provided for discharging stucco, plaster or other plastic material 26 on the sheet, such means preferably comprising a conveyor 27 for receiving the stucco and delivering it in a plastic state. Since conveyors for this purpose with means for rendering the stucco plastic are old in the art and form no part of this invention, there is no necessity for further illustrations or descriptions.

At each side of the table adjacent the conveyor is a member 28 arranged to engage the edges 24' of the cover sheet and fold or turn the edges up, maintain them in the turned up position as the plastic stucco is deposited from the conveyor and after the plastic stucco has spread over the surface of the cover sheet to the turned up edges, then turn or fold the edges down over the body of the stucco. This means for folding the edges of the sheet over the plastic body also being old in the art further illustrations or descriptions are unnecessary.

As the cover sheet with the stucco embraced by the folded over edges leaves the folding members it passes between rolls 29 and 30 arranged on opposite sides of the conveyor, one above the other. A sheet of paper or other suitable covering material 31 is fed onto the upper roll from a supply roll 32 and is passed over and under this roll to form the upper cover sheet of the plaster board. The lower forming roll 30 over which the conveyor travels is cylindrical in form similar to the other conveyor supporting pulleys 22 and the lower cover sheet resting on the conveyor will be flat between the folded over edges. In order to depress the board along the longitudinal edges from the turned up edge towards the center of the body of the stucco, the turned up edge at a height of about one half the normal thickness of the completed board from the bottom cover sheet is given another abrupt turn and is folded down over the plastic body parallel to the surface of the conveyor, which folding is accomplished during the passage of the edges through the forming members 28. The upper forming roll 29 applies the upper cover 31 to the upper surface of the plastic body as it passes under the roll and causes the stucco to be spread evenly between the cover sheets to form a board of uniform thickness except at the depressed longitudinal edges. The upper cover sheet is of such width that when it is applied it extends from a point adjacent one longitudinal edge to a point adjacent the opposite edge and its edges lay over and contact with the depressed folds of the under cover sheet. To depress the edges of the upper cover sheet and apply them to the depressed edge as enclosed by the under cover sheet, the ends of the upper forming roll may be enlarged integrally or, as shown, may be surrounded by belts 34 about one half the normal thickness of the finished board so that these enlargements will correspond to the depressions in the folded over edges of the under cover sheet and the paper 31' of the upper cover sheet passing over the enlargements as it continues under the roll in contact with the plastic body will be bent over the inner surfaces of the enlargements to contact with the upper surface of depressed folded over edges of the lower cover sheet and as this occurs at the time both cover sheets pass through or between the forming rolls the pressure on the stucco banked up on the lower sheet before the upper roll will cause it to fill in the depressed edges and main body between the two cover sheets and at the same time sufficient stucco will flow between the folded over edge portions of the under cover sheet and depressed edge portions of the upper sheet to bond them together. In order to insure the bonding between these portions of the cover sheets and maintain the depressed contour of the edges while the plastic body is beginning to set an ironing or pressing means is provided to continue over each depressed edge portion from the time the board leaves the forming rolls until the edges of the cover sheets are bonded and the plastic body set sufficiently to maintain its shape without forming means. This means for continuing the shape of the edge preferably comprises an endless belt 34 on each side of the table mounted to travel over pressure rollers 35 mounted in any desirable manner so that the surfaces of the belts are parallel to the conveyor and contact with the edges and maintain the depressions formed therein by the forming rolls. It is preferable to continue the pressing belts about the upper forming roll, as shown so that each belt not only forms the depression in the edge in the first instance but continues to maintain the depression so formed until the edges are bonded and the plaster body partially set.

The table and conveyor are of such length that the continuously formed board after passing beyond the ironing devices will allow the plastic body to set sufficiently to be cut off in desired lengths and be transported, without deforming its shape, to kilns where the set is completed and excess moisture removed to complete the product.

Figure 15 illustrates a section taken at right angles to the bottom cover sheet and at right angles to the longitudinal edges from which it is seen that the longitudinal edges are depressed from the same face of the board parallel to the other face and the entire depressed portion is enclosed by the fold 24' of the bottom cover sheet 24 and also covered by the edge portion 31' of the top cover sheet 31. It is contemplated to employ this plaster sheathing board by applying the longitudinal edges horizontally against the studding of the frame of the building and, by reversing the flat surface of every other board in a vertical direction, the adjacent depressed edges will overlap and the overlapped joints nailed to the studding 36, as shown in Figure 17. It is to be noted here that the nail securing the horizontal edges will pass through three thicknesses of paper in each board. In this form when applied as sheathing only one half, or every other horizontal jointure, will provide water shed joints. It is therefore, contemplated by this invention to form a plaster sheathing board in which the longitudinal edges are depressed from faces opposite each other parallel to the other face, as shown in Figure 16, so that the boards so formed when applied as sheathing need not be reversed and the lower horizontal edge of each will lay over or lap the top horizontal edge of the board next below it and each horizontal joint will be a water shed, making a most desirable sheathing to be used with clap boards.

The machine to form this type of tapered edge, while remaining the same in principle as the one above described, is modified to a certain degree, and since the changes are but slight the entire machine is not illustrated and only the changes shown. As the edges are depressed from opposite faces uniformly they are parallel and as the same amount of paper is employed in the bottom cover sheet and each edge portion is turned up and then folded over the plastic body, it is only necessary to make certain changes on one side of the machine. It is contemplated to utilize the conveyor 1 to form the taper on one edge of the bottom cover sheet by applying a continuous flat addition 37 on the upper side of the conveyor adjacent one edge which addition or portion of the conveyor equals approximately in thickness to one half the normal thickness of the finished board and presents a raised surface for the paper 24 of the bottom sheet to rest upon which is parallel to the surface of the belt 34 about the oppositely disposed end of the upper forming roll 29. The weight of the plastic stucco will cause the paper, dampened by the moisture in the stucco, to conform to the raised member 37 on the edge of the conveyor as it advances through the folding members 28 towards the forming rolls and on this side the folding member is arranged to engage the edge portion of the bottom cover sheet at the top of the raised conveyor addition 37 turn it up straight while the plastic stucco is being deposited and then fold it down over the stucco parallel to the main flat face of the lower cover sheet resting on the conveyor just before it enters between the forming rolls. The end of the forming roll 29 adjacent the raised conveyor addition 37 remains cylindrical and of the same diameter as the main body so that the upper cover sheet 31 applied thereby is parallel to the main body of the under cover sheet to the edge and lays over and is bonded to the folded in edge portion 24' of the under sheet in the same manner as on the opposite longitudinal edge, as hereinbefore described. Since it is necessary to insure the continuous contour of both edges after the formed board has passed from the forming rolls, the continuous raised addition 37 to the conveyor will support the pressed up portion of the under cover sheet resting thereon and it may not be necessary to provide any further means or ironing device on this side of the table, however, it is preferable to do so and this device differs from the one for the opposite edge only in that the contacting surface of the belt 38 passes over rollers 39 arranged to be supported parallel to the main flat body of the conveyor. The board then continues on to the end of the machine and is dried in the same manner as hereinbefore described.

The use of the lap edged plaster board for sheathing under clap boards has been described in detail, however, plaster board of this character is not limited to such use as it possesses other advantages than those before described that make it desirable for both plaster board and wall board for the interior of houses in which it is applied with the longitudinal edges of the board perpendicular to the floor with the joint between boards resting against the vertical studding. In such a case the lapped edges are secured to the studding by a single line of nails each passing through six thicknesses of the covering material, which is the strengthening element of the plaster, and can be applied in half the time required as raw or bound edge boards where it is required to drive a line of nails through the edge of each board.

I claim:

1. In a machine for producing lap edged plaster board comprising the combination of means for advancing a cover sheet with means for turning up the edges thereof, means depositing a plastic material thereon between the turned up edges, means for folding in the turned up edges upon the plastic material and depressing the folded in portions approximately one half the normal thickness of the finished board, means for applying a second cover sheet, and means for applying pressure thereon to bond the cover sheets and plastic material.

2. In a machine for producing lap edged plaster board the combination with means for advancing a cover sheet of stationary means for turning up the edges thereof, means depositing a plastic material thereon between the turned up edges, means for folding in the turned up edges upon the plastic material, means for depressing the edge portions so enclosed from opposite faces of the plastic material approximately one half the thickness of the finished board, means applying a second cover sheet, and means applying pressure thereon to cause the plastic material to flow under the folded in edge portion and between the cover sheets to bond the cover sheets to each other and to the plastic body.

3. In a machine for producing lap edged plaster board, the combination with an endless conveyor of means for supplying and feeding a cover sheet of fibrous material thereto, stationary folding members arranged on opposite sides of the conveyor provided with pickups adapted to engage under the edges of the covering sheet and turn them up to an upright position, means for depositing a plastic material upon the cover sheet between the turned up edges as it advances through the folding members, said members including means for depressing the edge portions so enclosed parallel to the main body of said cover sheet for substantially one half the thickness of the finished board, means for supplying and feeding a second cover sheet, a pressure roller receiving and applying the second sheet over the plastic body and turned in edge portions of the first sheet with sufficient force to cause the plastic material to flow into the depressed edge portions and between the cover sheets to bind the cover sheets to each other and to the plastic body, said pressure roll maintaining the conformation of the depressed edge portions with the second sheet in contact therewith.

CHARLES R. BIRDSEY.